(12) United States Patent
Nies et al.

(10) Patent No.: US 7,956,482 B2
(45) Date of Patent: Jun. 7, 2011

(54) SPEED CONTROLLED PITCH SYSTEM

(75) Inventors: Jacob Johannes Nies, Zwolle (NL); Patrick Achenbach, Rheine (DE); Peter Rogall, Emsbüren (DE); Axel Braicks, Rheine (DE); Stefan Rieken, Lathen (DE)

(73) Assignee: General Electric Company, Schenetady, NY (US)

( * ) Notice: Subject to any disclaimer, the term of this patent is extended or adjusted under 35 U.S.C. 154(b) by 326 days.

(21) Appl. No.: 12/016,227

(22) Filed: Jan. 18, 2008

(65) Prior Publication Data

US 2009/0184519 A1 Jul. 23, 2009

(51) Int. Cl.
 *F03D 9/00* (2006.01)
 *H02P 9/04* (2006.01)
 *F03B 13/00* (2006.01)
 *F03B 13/10* (2006.01)
 *F03B 7/00* (2006.01)

(52) U.S. Cl. ............... 290/55; 290/43; 290/44; 290/54; 416/89

(58) Field of Classification Search ............ 290/43, 290/44, 54, 55; 416/89
See application file for complete search history.

(56) References Cited

U.S. PATENT DOCUMENTS

| | | | | |
|---|---|---|---|---|
| 1,970,847 A | * | 8/1934 | Gibbs | 416/137 |
| 1,982,039 A | * | 11/1934 | Youngberg | 416/89 |
| 1,986,752 A | * | 1/1935 | Rorvik | 416/89 |
| 2,029,503 A | * | 2/1936 | Peterson | 416/89 |
| 2,052,454 A | * | 8/1936 | Ellwood et al. | 416/89 |
| 2,096,860 A | * | 10/1937 | Renquist et al. | 416/89 |
| 4,068,131 A | * | 1/1978 | Jacobs et al. | 290/55 |
| 4,157,368 A | * | 6/1979 | Fernandes | 261/155 |
| 4,160,170 A | * | 7/1979 | Harner et al. | 290/44 |
| 4,161,658 A | * | 7/1979 | Patrick | 290/44 |
| 4,189,648 A | * | 2/1980 | Harner | 290/44 |
| 4,257,736 A | * | 3/1981 | Jacobs | 416/51 |
| 4,374,631 A | * | 2/1983 | Barnes | 416/23 |
| 4,431,375 A | * | 2/1984 | Carter et al. | 416/132 B |
| 4,495,423 A | * | 1/1985 | Rogers | 290/44 |
| 4,653,982 A | * | 3/1987 | Kojima et al. | 416/44 |

(Continued)

FOREIGN PATENT DOCUMENTS

WO WO 2006007838 A1 1/2006

*Primary Examiner* — Pedro J Cuevas
(74) *Attorney, Agent, or Firm* — Global Patent Operation; Douglas D. Zhang (57) ABSTRACT

The present patent application concerns wind turbine having a rotor with a first rotor blade and a pitch control system with a controller and a first drive system for adjusting a pitch angle of the first rotor blade, wherein the drive system is adapted to transform rotational energy of the rotor blade rotating about its longitudinal axis into another form of energy such that a counter torque against the rotating direction is induced. Further, it concerns a method for controlling a pitch velocity of a rotor blade of a wind turbine, the wind turbine comprising at least one drive system for adjusting a pitch angle of said rotor blade, the drive system being adapted to operate in a active mode, wherein the drive system rotates the rotor blade, and in a passive mode, wherein the drive system exerts a counter force against the rotating direction, when the rotor blade being rotated by another force than the force of the drive system, wherein the pitch velocity is controlled by operating the drive system in said passive mode when the pitch of the rotor blade is changed from a first position to a second position.

20 Claims, 4 Drawing Sheets

U.S. PATENT DOCUMENTS

| | | | |
|---|---|---|---|
| 4,952,119 A * | 8/1990 | Widseth | 416/3 |
| 5,907,192 A * | 5/1999 | Lyons et al. | 290/44 |
| 6,428,274 B1 * | 8/2002 | Hehenberger | 416/153 |
| 6,761,533 B2 * | 7/2004 | Favaro | 416/51 |
| 6,819,086 B2 | 11/2004 | Wobben | 320/166 |
| 7,019,413 B2 * | 3/2006 | Kinoshita | 290/4 R |
| 7,256,509 B2 | 8/2007 | Brandt et al. | 290/44 |
| 7,351,033 B2 * | 4/2008 | McNerney | 416/1 |
| 7,513,742 B2 * | 4/2009 | Rogall et al. | 416/47 |
| 7,635,923 B2 * | 12/2009 | DeAngeles | 290/44 |
| 7,802,968 B2 * | 9/2010 | Jacobsen | 416/228 |
| 7,883,313 B2 * | 2/2011 | Nies et al. | 415/121.2 |
| 7,891,944 B2 * | 2/2011 | Jeppesen et al. | 416/1 |
| 7,895,018 B2 * | 2/2011 | Nies | 702/188 |
| 7,898,100 B2 * | 3/2011 | Andersen et al. | 290/44 |
| 7,901,184 B2 * | 3/2011 | Nies et al. | 416/132 B |
| 7,905,707 B2 * | 3/2011 | Numajiri et al. | 416/155 |
| 2001/0042983 A1 * | 11/2001 | Kinoshita | 290/44 |
| 2004/0022628 A1 * | 2/2004 | Favaro | 416/51 |
| 2006/0083615 A1 * | 4/2006 | Rogall et al. | 416/98 |
| 2007/0057517 A1 * | 3/2007 | McNerney | 290/44 |
| 2007/0189900 A1 * | 8/2007 | Rogall et al. | 416/132 B |
| 2007/0246943 A1 * | 10/2007 | Chang et al. | 290/44 |
| 2009/0021021 A1 * | 1/2009 | Grenier | 290/55 |
| 2009/0184519 A1 * | 7/2009 | Nies et al. | 290/44 |
| 2010/0127494 A1 * | 5/2010 | Garmendia Olarreaga et al. | 290/44 |
| 2010/0135800 A1 * | 6/2010 | Melius | 416/44 |
| 2010/0135801 A1 * | 6/2010 | Melius | 416/44 |
| 2010/0143135 A1 * | 6/2010 | Nies et al. | 416/147 |
| 2010/0187825 A1 * | 7/2010 | Carr | 290/54 |
| 2010/0226772 A1 * | 9/2010 | Deering | 416/1 |
| 2011/0020136 A1 * | 1/2011 | Numajiri | 416/246 |
| 2011/0033294 A1 * | 2/2011 | Geiser | 416/44 |
| 2011/0038726 A1 * | 2/2011 | Elkin et al. | 416/1 |
| 2011/0038728 A1 * | 2/2011 | Elkin et al. | 416/31 |
| 2011/0040413 A1 * | 2/2011 | Jeppesen et al. | 700/275 |
| 2011/0046802 A1 * | 2/2011 | Jones et al. | 700/287 |

* cited by examiner

SPEED CONTROLLED PITCH SYSTEM

BACKGROUND OF THE INVENTION

The present patent application relates to a wind turbine having a rotor with a first rotor blade and a pitch control system. Further, present patent application relates to a controller for controlling a pitch angle of at least one rotor blade of a wind turbine. Finally, the present patent application relates to a method for controlling a pitch velocity of a rotor blade of a wind turbine.

In case of an emergency event, e.g. the loss of the grid, a wind turbine has to be stopped as fast as possible. Therefore, rotor blades of a wind turbine are rotated from a working position into a feathered position. For this purpose emergency pitch systems are used. The velocity of the rotation is often not controlled since in many emergency events a pitch controller is not powered and therefore not in operation. The desired velocity for rotating the rotor blade from an operating position to a feathered position is primarily taken to reduce the power output as quick as possible, not to reduce the turbine loads resulting from this action. For example if the rotor blades are rotated too fast from the operating position into the safety or feathered position, the rotor is still rotating with relatively high speed when the rotor blades are brought into the feathered position. In this case high forces may be created that suck the rotor into the direction of the wind so that the wind turbine might be damaged. Thus, in previous wind turbines the pitch velocity is fixed or limited such that such large forces are avoided. These fixed pitch velocities are normally very low, e.g. 8° per second. As the at the time of the design and construction of the wind turbine the circumstances of emergency events are obviously not known, the fixed pitch velocities are independent from the wind conditions and meet worst case scenarios. For limiting the pitch velocity, emergency pitch systems often contain a safety brake system.

Other known emergency pitch systems are provided with energy storage devices, e.g. accumulators, batteries or capacitors. The energy storage devices power the pitch controller during a grid outage and enable a rotation of the rotor blade from the operating position into the feathered position. If accumulators or capacitors are used, they are charged during normal operation of the wind turbine.

Further, specific embodiments of known emergency systems have a direct electrical connection between the energy storage devices and a pitch motor that drives the rotor blade. In the latter case the pitch velocity is uncontrolled since the velocity of the pitch system depends on the counter torque it has to overcome and energy storage charge/performance status of the energy storage device, e.g. the battery or the accumulator.

BRIEF DESCRIPTION OF THE INVENTION

In view of the above, a wind turbine having a rotor with a first rotor blade and a pitch control system with a first drive system for adjusting a pitch angle of the first rotor blade, wherein the drive system is adapted to transform rotational energy of the rotor blade rotating about its longitudinal axis into another form of energy such that a counter torque against the rotating direction is induced.

According to a further aspect, a method for controlling a pitch velocity of a rotor blade of a wind turbine, the wind turbine comprising at least one drive system for adjusting a pitch angle of said rotor blade, the drive system being adapted to operate in a active mode, wherein the drive system rotates the rotor blade, and in a passive mode, wherein the drive system exerts a counter force against the rotating direction, when the rotor blade being rotated by another force than the force of the drive system, wherein the pitch velocity is controlled by operating the drive system in said passive mode when the pitch of the rotor blade is changed from a first position to a second position.

According to a further aspect a controller for controlling a pitch angle of at least one rotor blade of a wind turbine, the controller being adapted to control a first drive system for adjusting the pitch angle of a first rotor blade, wherein the first drive system can be operated in an active mode in which the drive system rotates the rotor blade about its longitudinal axis, and in a passive mode in which a rotation of the rotor blade about its longitudinal drives the drive motor such that the drive system transforms the rotational energy in another form of energy According to the present patent application, the pitch of a rotor blade of a wind turbine is a rotation of the rotor blade about its longitudinal axis.

Further aspects, advantages and features of the present invention are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
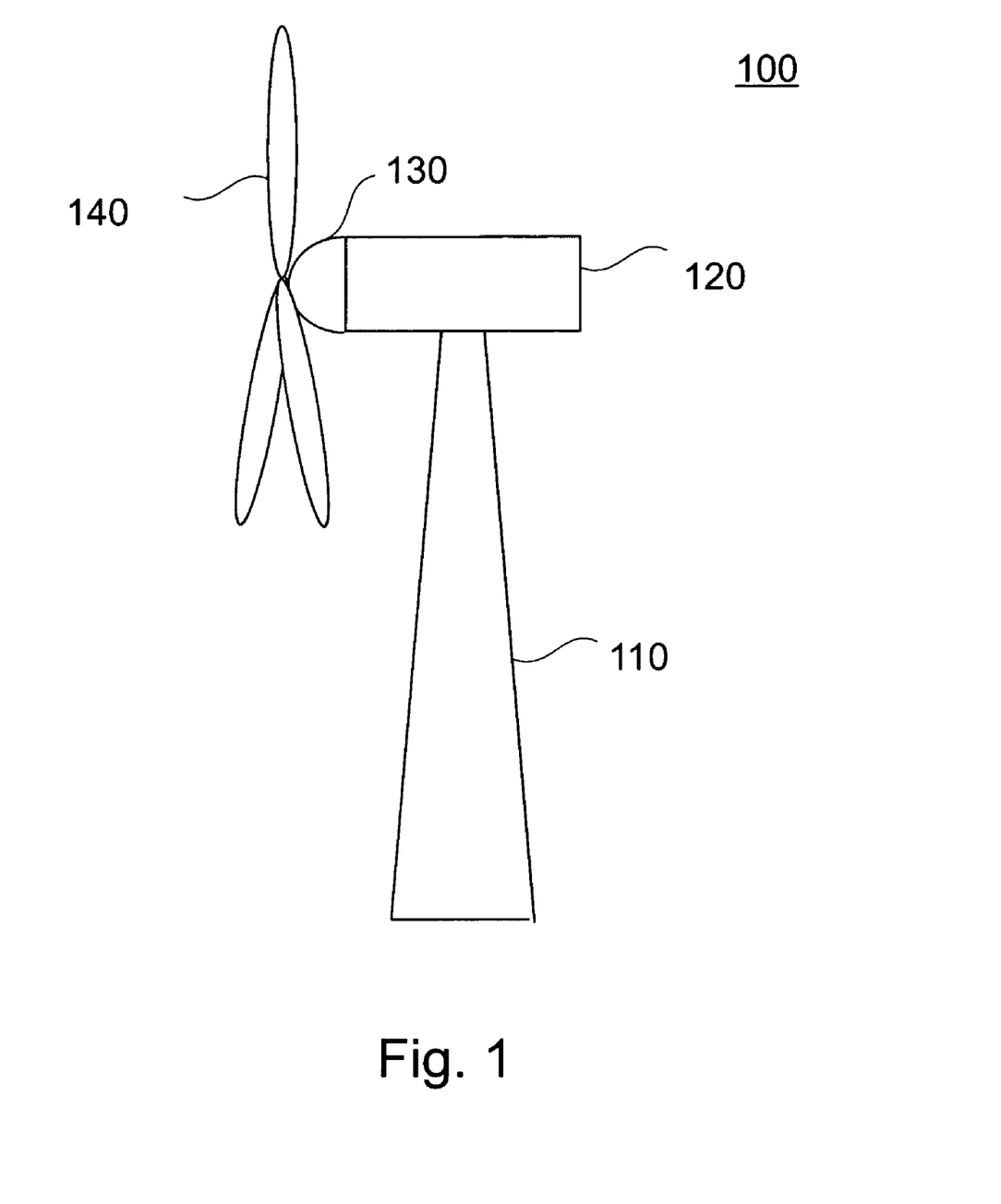
FIG. 1 illustrates a wind turbine.

FIG. 1 shows a wind turbine 100 with a tower 110, a nacelle 120, a hub 130 connected to the nacelle 120 and a rotor with three rotor blades 140. The nacelle 120 is mounted on the tower 110 of the wind turbine 100 and may be rotated about a vertical axis to position the rotor in an optimal position with respect to the wind. The rotor blades 140 are connected to the hub. The wind turbine 100 may also include less or more rotor blades 140, for example a single rotor blade, two rotor blades or four and more rotor blades 140. The wind rotor of the wind turbine includes the rotor blades 140 and the hub 130. A generator (not shown) is arranged in the nacelle. The generator is connected to the hub 130 directly or via a gear box. The wind turbine 100 works as follows for transforming kinetic energy of the wind into electrical energy: The wind is an air flow that impinges onto the rotor blades 140 of the rotor and forces the rotor to rotate around its horizontal axis. This rotation is transferred to the generator that transforms the mechanical rotation into an electrical current. The electrical current is fed into the grid or utility grid.

Figure 2:
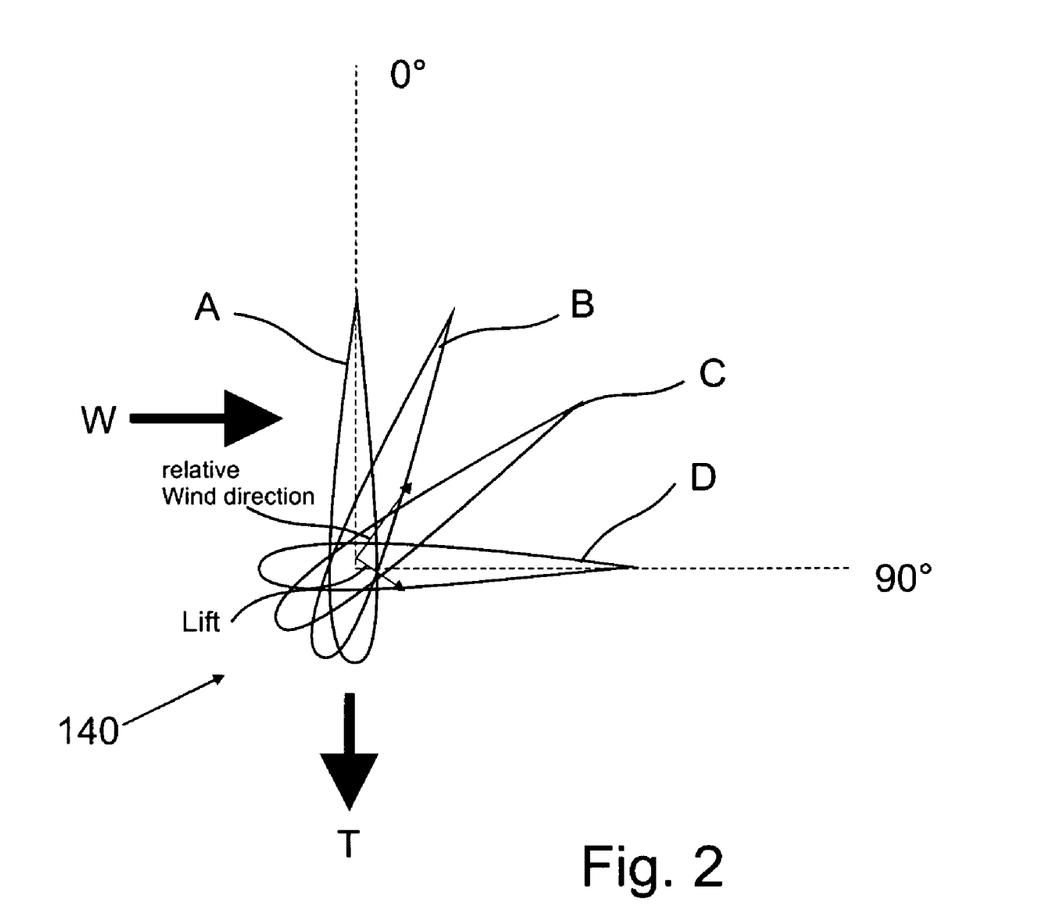
FIG. 2 illustrates schematically different pitch angles of a rotor blade of a wind turbine.

Each rotor blade 140 is rotatable around its longitudinal axis in order to position the rotor blades 140 at a specific pitch angle. The maximum rotation about the longitudinal axis of the blade during operation of the wind turbine defines a pitch range of the rotor blade 140. In FIG. 2, four different pitch angles are shown. In a 0° position A, the rotor blade 140 is positioned such that it presents lift of which a component is driving the rotor. The lift is depending on the relative wind direction, which is the resultant wind direction of the wind and the air flow due to the rotation of the rotor. The lift is always perpendicular to the relative wind direction. A second operation position is the position B. That is the position of the rotor blade 140 is chosen to limit the lift and therefore limit the torque and the thrust. The operating position B may vary depending on wind conditions. In the operating position B the wind is imparting a torque on the rotor such that the rotor rotates in the rotating direction T. Therefore, in the operating positions A and B, the kinetic energy of the wind is transformed into rotational energy. The generator transforms the rotational energy into electrical energy which is then fed into the grid. Under some conditions, the 0° position may also be an operating position. Further, the rotor blade 140 may be rotated into a feathered position D. In the feathered position D, the rotor speed is reduced due to a high air resistance of the blade in the rotation direction T. It should be noted that the feathered position D may also have another position than exactly a 90° position. In the feathered position D the rotor blade 140 does not cerate any rotational energy due to the aerodynamic forces created by an oncoming wind. Further, the 90° position may be different to the position in which no torque on the rotor is produced, which will result in an idling speed of 0 rpm (no movement). The difference between the two positions may be in the order of 0° to 5°. In fact, the feathered position is the position in which the rotor blade 140 has to be rotated in cases of emergency stop situations. Thus, the rotor is not accelerated but decelerated as in wind direction W the rotor blade 140 presents essentially no air resistance. A continuously variable pitch may operate with a pitch angle between 0 and 90 degrees in which the parking or feathered position represents the position in which the wind turbine rotor blade 140 being rotated substantially out of the wind. The pitch range in this example is 90°, namely from the 0° position A to the feathered position D. Other pitch ranges may be possible, e.g. the rotor blade 140 may not adapted to reach the 0° position, or the feathered position D is not exactly a 90° position.

Between the operating position B and the parking or feathered position D, the rotor blade 140 has a neutral position C in which a balance of rotational forces about the longitudinal axis of the rotor blade 140 is established as it will be explained in the following. The wind forces push the rotor blade into the feathered position D, such that, in consequence, a pitch motor has to drive the rotor blade against the wind forces into the operating position B and either the pitch motor or another device retains or locks the blade in the operating position. Further, in case the wind turbine 100 is optimally positioned to the wind, i.e. the horizontal axis of rotation of the wind rotor is parallel to the wind direction W, and when the wind rotor is rotating, an air stream opposite to the rotation direction T exerts rotational forces on the rotor blade to the 0° position A. The neutral position C is the position where the torques around the longitudinal axis of the rotor blade 140 due the wind forces and the forces of the air stream neutralize each other, in other words that the torques around the longitudinal axis of the rotor blade 140 are balanced. It should be noted that the neutral position C may be different from a position of the rotor blade at which the rotor does no longer get energy out of the wind. This may depend on the airfoil of the blade 140.

If the wind rotor stands still and the blades are in the feathered position D, a motor rotates the rotor blade 140 from the feathered position D into the operating position B against the wind forces that try to push the rotor blade 140 back into the feathered position D. If the rotor is rotating and the rotor blades has to be brought from the operating position B into the feathered position D and no other velocity regulating devices, e.g. a break, are used, the wind forces are pushing the blade into the neutral position C. For the further movement from the neutral position C to the feathered position D, the pitch motor rotates the rotor blade against the forces of the air stream. If the wind rotor is rotating and the rotor blade 140 is in the feathered position D, the forces of the air stream push the rotor blade from the feathered position D into the neutral position C. For the further movement from the neutral position C to the operating position B, the pitch motor rotates the rotor blade against the wind forces.

Thus, without brakes or pitch motors to control the pitch of the rotor blade, the rotor blade would always rotate into the neutral position C. It should be noted that the neutral position C as well as the optimal operating position B depend on the wind force on the site where the wind turbine 100 is constructed.

Once a controller of any form is part of the emergency pitch system, one can use the controller to optimize the pitch angular position and speed over the course of an emergency event. At first, a pre-defined pitch speed profile can be used. However, this assumes that one can map the optimum behavior in advance.

Figure 3:
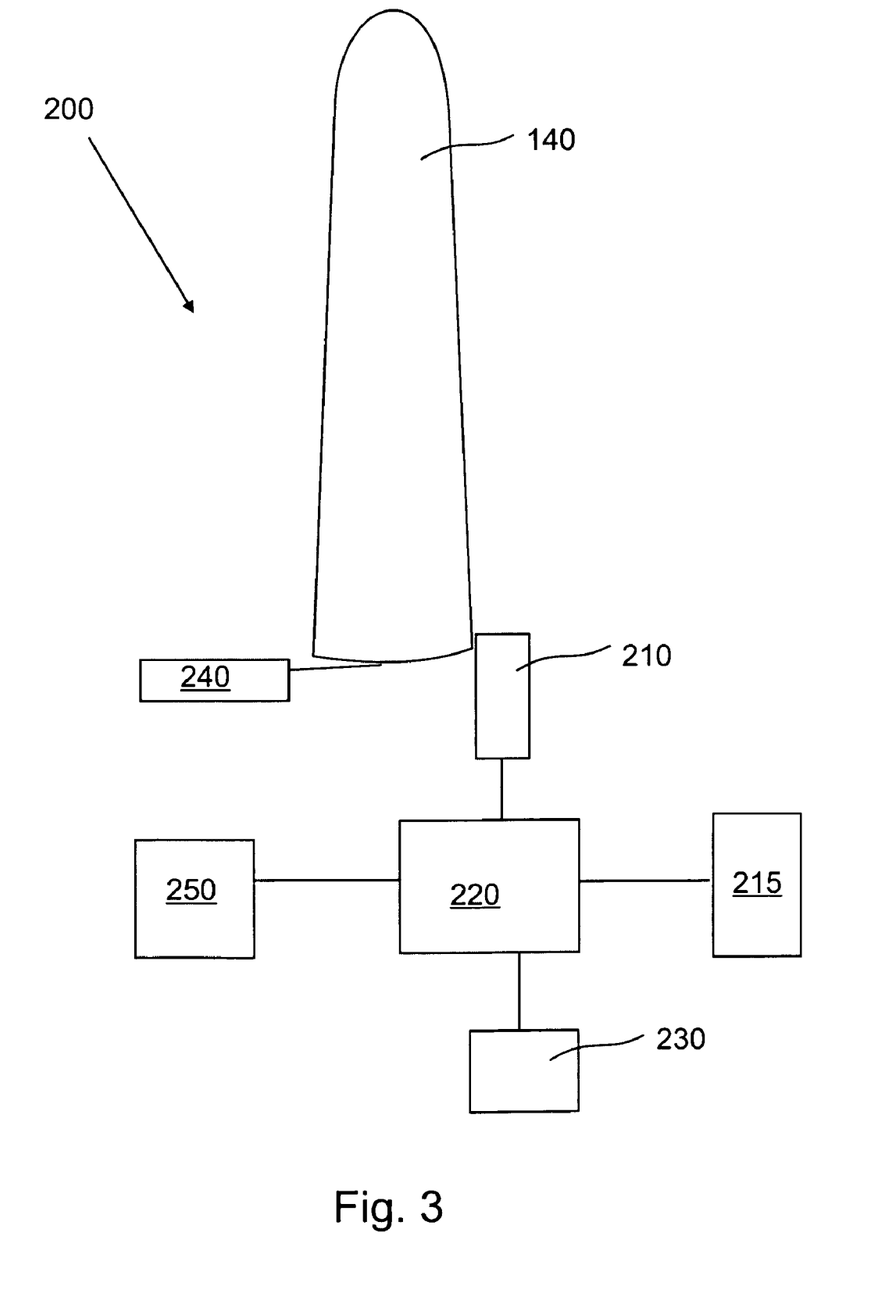
FIG. 3 illustrates schematically a pitch control system according to the present patent application.

FIG. 3 shows a schematical drawing of a pitch control system 200. A pitch control system 200 may also have more parts which are not shown in the drawing for the sake of simplicity. Furthermore, only one rotor blade 140 is shown. The pitch control system 200 may control the pitch of one or more rotor blades 140, e.g. two, three or more blades of the wind turbine 100. The rotor blade 140 may be rotated about its longitudinal axis within a pitch range from about 0° to about 90°, which has already been discussed with respect to FIG. 2. A pitch motor 210 is associated to each rotor blade 140 of the rotor to adjust the pitch angle. The pitch angle may be any position within the pitch range. It should be noted, that it is also possible to associate several pitch motors 210 to a single rotor blade 140, e.g. two or three pitch motors 210. In a typical embodiment, the pitch motor(s) 210 is/are arranged in the hub 130.

In case of losing the connection to the grid or another emergency situation, the wind turbine 100 might not receive power from the grid to perform the emergency actions, among which pitching of the rotor blade 140 to position D. To maintain the operation of the pitch control system during such grid outage, a controller 220 of the pitch control system 200, e.g. a programmable logic controller (PLC), must be supplied with energy. The electrical energy needed to power the pitch controller 220 during emergency events is generally stored in an electrical energy storing device, e.g. an accumulator 230, ultra caps or super caps. As long as it is available, the accumulator 230 is charged with electricity from the grid or by an uninterruptible power supply (UPS). It should be noted that the emergency power supply for the controller 220 may be a different one than for the drive system for the pitch, e.g. the pitch motor(s) 210. E.g. the emergency power supply for the controller 220 may be a capacitor, like a ultra or super cap, and the emergency power supply for the drive system may be a spring as it will be explained here below.

According to an embodiment, the pitch motor 210 is adapted to work as a generator. As already explained with respect to FIG. 2, the rotor blade 140 may be rotated from the operating position B to the neutral position C only by the wind forces. A part of that energy used to rotate the rotor blade 140 may be transformed into electrical energy by the pitch motor 210. Thus, electrical current produced by the pitch motor 210 may be fed to the controller 220 to power the controller 220. In a further embodiment, the produced energy may be used to charge an accumulator 230. When the motor is operated as a generator, the motor is imparting a counter torque against the diving torque exerted onto the motor by the rotating blade. That means, in that case, the motor is working as a brake, thus reducing the pitch velocity. In other words, the generator counter torque acts as a braking torque reducing the pitch velocity of the rotor blade. This effect may be used to control the pitch velocity of the rotor blade 140 between the operating position B and the neutral position C.

Further, —the pitch controller 220 may regulate the pitch speed by using the motor 210 as a generator which dumps the excess power in an electrical energy storage device, e.g. the accumulator 230 or a specific accumulator for a pitch motor 210 or any other suitable storage device. Furthermore, the electricity can be used to provide energy to another emergency pitch system, e.g. a pitch motor of another rotor blade of the rotor. Additionally, in a specific embodiment, the electrical energy might be fed back into the grid 215. Finally, in a further embodiment, the electricity might be fed into a dump load, resistor or a brake chopper. Also, a combination of several or all of the discussed loads may be used in an embodiment. In a further embodiment, the generated electricity may be used to power and move tip brakes of the rotor blade 140 or of other rotor blades of the rotor. The electric load could be varied in a typical mode, such that the brake torque induced by the motor 210 and thus the pitch velocity may be controlled between the operating position B and the neutral position C. It should be noted, that, in a typical embodiment, the pitch motor 210 may not work as a brake in the complete angular range between the operating position B and the neutral position C, but only in a part of the angular range between the operating position B and the neutral position C.

Further it should be noted that the motor may also be operated as a generator in the case of a rotating wind rotor when the blades are in the feathered position. In this event, the air stream forces the rotor blades into the neutral position, and the pitch motor may be operated in the generator mode during the rotation of the blade from the feathered position D to the neutral position C.

In a typical embodiment, the blade 140 may be driven from the 0°-position A or the operating position B to the feathered position D by one or more springs 240. The spring 240 could be a helical spring, a coil spring, a pneumatic spring or a combination of the foregoing. Also other devices for storing mechanical energy could be used instead of a spring. Thus, in case of an emergency event, if the electricity from the grid 215 is cut, the rotor blade 140 could nevertheless return into the feathered position D to stop the rotor without the need to use the pitch motor 210 for actively driving the rotor blade 140 during the complete pitch movement between the operating position B and the feathered position D. During the blade rotation from the operating position B into the feathered position D, the energy stored in the spring 240 drives the rotor blade 140 and thus also the pitch motor 210. The motor 210 may now be operated as a generator so that it generates energy for providing electrical power to the loads, as already described here-above, e.g. for charging the accumulators with the excess power. Simultaneously, the counter or brake torque of pitch motor 210 being operated as a generator reduces the pitch velocity of the blade so that the pitch motor 210 serves as a brake.

In a typical embodiment of the wind turbine, the pitch velocity is controlled depending on a signal of a sensor.

In a further embodiment, if the spring is pre-stressed to or in the feathered position D, the pitch motor 210 may produce electrical energy during the complete movement from the operation position B to the feathered position D. It should be noted, that, in a further embodiment, the pitch motor 210 may not serve as a brake in the complete range between the neutral position C and the feathered position D, but only in a part of the range between the neutral position C and the feathered position D. This depends on the dimension and the arrangement of the spring 240. In a typical embodiment, the spring 240 is located in the hub 130.

In case the pitch controller 220 is no longer active, either due to lack of power provided by the grid 215, the accumulator 230 or the pitch motor 210, the pitch control system 200 may include a brake, e.g. a centrifugal brake, that limits the pitch velocity of the rotor blade 140, typically if the pitch system is be driven by springs 240. Further, in an embodiment at a 90° position, the blade 140 is blocked, such that a further rotation about the longitudinal axis of the blade 140 is limited. Thus, the blocking prevents a further rotation in normal operation of the wind turbine.

In a further embodiment, the controller is further adapted to electrically connect the motor operating in the generator mode to an accumulator, a second motor for adjusting a pitch angle of a second rotor blade, or a dump load.

In emergency brake situations, the rotor blade 140 has to be rotated from its operation position B into the feathered position D as fast as possible. But, if the pitch has passed the neutral position C, suction forces are exerted on the hub 130 pulling the hub a direction opposite to the wind direction W. These forces may damage or even destroy the wind turbine 100 if they are too high. Therefore, during the deceleration process of the wind rotor, it is important to control the pitch velocity. Accordingly, the pitch control system 200 has at least one sensor 250 that is connected to a controller 230. In a specific embodiment, the measured value of the sensor may be a controlled process variable. For example, the sensor 250 is a vibration sensor located in the rotor blade 140, hub 130, nacelle 120 or tower top. In a typical embodiment of the present patent application, the sensor 250 includes at least one accelerometer, in particular an accelerometer for detecting a back and forth movement. The accelerometer may be located in the hub 130 near the blade root of said rotor blade 140. These accelerometers can measure the suction force exerted on the rotor of the wind turbine 100. According to another embodiment, the sensor 250 may include a position and speed sensor for the rotor, a stress or strain sensor in structural components, e.g. the rotor blade 140, a blade bearing, the hub 130, shaft, frames, or the tower 110. According to further embodiments, the sensor 250 may be adapted to measure wind speed or wind direction. In a typical embodiment, the sensor 240 may be a rotational speed sensor of the rotor, a sensor for measuring the position of the rotor, a sensor measuring the pitch angle of at least one rotor blade. Further, a turbine controller may provide a signal to the pitch controller, as via the turbine controller other signals may be relayed directly or indirectly. This data may be historical data, actual data of predictions based on historic data.

The signals of one or more sensors 250 are used by the controller 230 to control the pitch velocity of the rotor blade 140 or of all rotor blades 140. For example, if back and forth accelerometers are used as sensors 250 to produce a feedback signal, the pitch velocity might be limited to a value such that loads to which the components of the wind turbine 100 are designed are limited, e.g. to avoid an overstress of the tower structure.

Thus, in a first control strategy the feedback signal of the above sensor 250 is used to control the pitch velocity.

Further, the pitch controller 220 may use a second control strategy in which maps of expected turbine behavior on/of components in the turbine, such as torque, forces, motion (tower closest approach), speed and acceleration are used for control. These variables may be mapped depending on operational variables as pitch angles, rotor speed and position, torque, power. For example, a blade in a 6 o'clock position may be pitched at a higher speed than a blade in a 12 o'clock position, as the thrust is a function of the windspeed and thus a function of the ground height. Wind speed and direction in the recent history (second, minutes), air temperature in recent history, set values for individual turbines (e.g. altitude, altitude and temperature yield density), and turbine configuration parameters. In a further embodiment, the controller 220 may take into account short term prediction of the signals.

Instead of a or additional to the sensor signal, the controller 230 of the pitch control system 200 might use input from the turbine controller through which other signals may be relayed directly or indirectly.

The pitch controller may also use the following, third control strategy which utilizes predefined set position profiles given from the turbine master PLC. Thus, the action of the pitch controller 220 alone accelerometer as well as the turbine master PLC alone or a combination of both.

The control strategies discussed above may be used alone or in combination. Furthermore, the rotor blades 140 of a wind rotor may be separately controlled by the controller 220, as e.g. the wind speed may differ for a rotor blade during the rotation of the rotor. Therefore, the different rotor blades 140 of the same rotor may be independently rotated about their longitudinal axis to the feathered position D. In order to keep the loads down, the rotor blades may be rotated in symmetry about their longitudinal axis. That means the rotor blades should all have about the same pitch angle all the time. Therefore, the independent controllers for each rotor blades may each take into account the pitch angle of the other rotor blades. This may only be done when the rotor is no longer accelerating. As long as the rotor is accelerating or at a too high rotor speed, all blades should go as fast as they can into the feathered position.

In a further embodiment, the torque of the wind rotor may also be regulated in dependence of the values delivered by the sensor 250. For that purpose, the sensor 250 or the controller 220 may be connected to a wind turbine controller, typically located in the nacelle.

Figure 4:
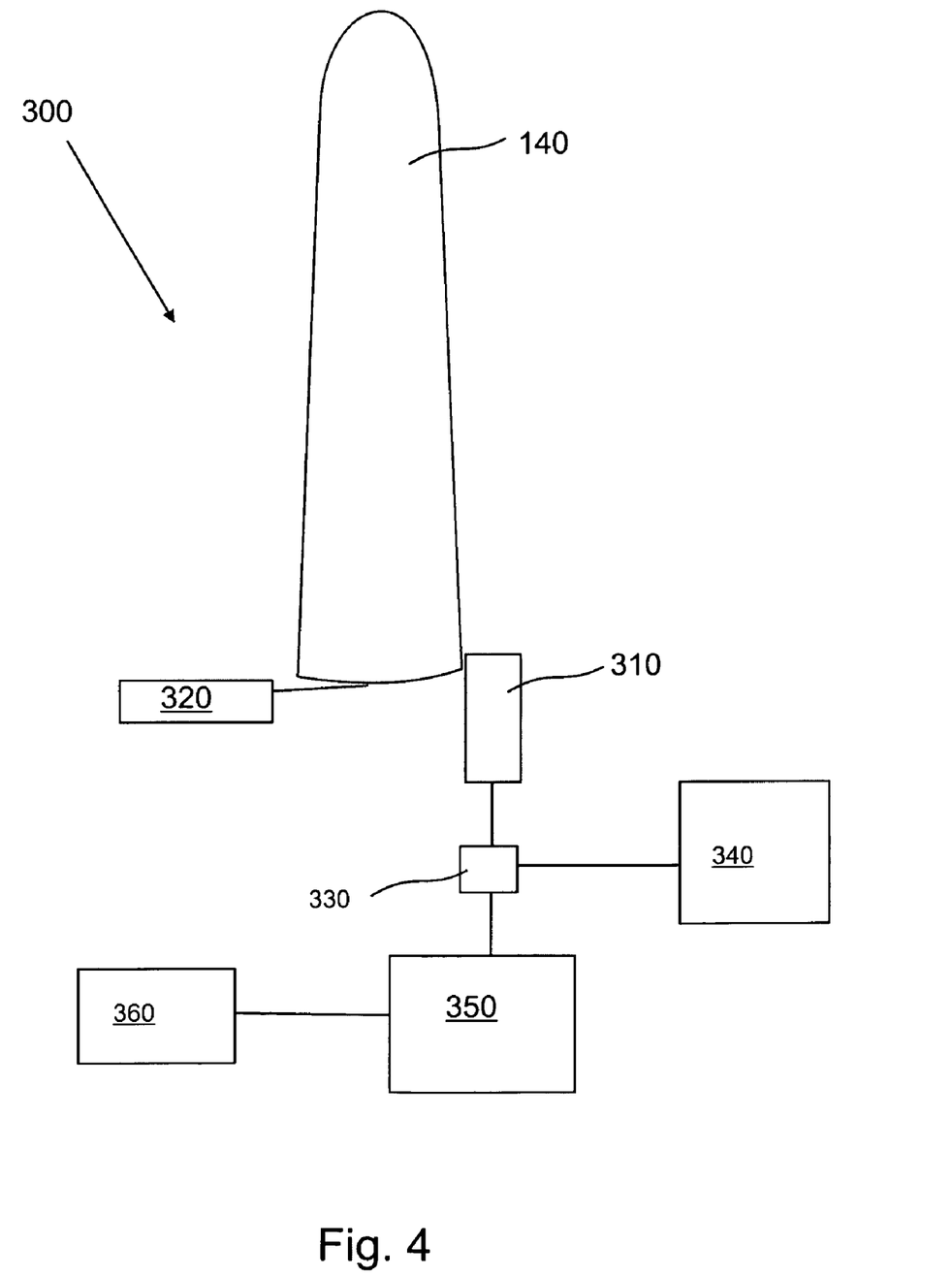
FIG. 4 illustrates schematically a pitch control system of a further embodiment.

In a further embodiment, a mechanical pitch system may be used. FIG. 4 shows such a pitch control system 300. The rotor blade 140 is than driven by a hydraulical or pneumatic actuator 310. The hydraulical or pneumatic actuator 310 may be located in the nacelle 120 or in the rotor 130. The hydraulic actuator may be a two way actuator such that it may actively rotate the rotor blade around its longitudinal axis from the feathered position D to the 0° position and, if necessary, actively rotate the blade from the 0° position or the operating position to the feathered position D e.g. from a feathered position D to a operating position B. In case of a one way pneumatic or hydraulical actuator 310, the actuator may work against a spring 320 that forces the rotor blades into the feathered position for effecting a rotor stop or into a position where the rotor does not longer get energy out of the wind. The hydraulical or pneumatic actuator 310 is connected via a valve 330 to a reservoir 340. The reservoir 340 may be a pressure reservoir in case of a pneumatic actuator or a hydraulic reservoir with a nitrogen bubble. A pitch controller 350 controls the valve 350 depending on a signal of a pitch sensor 360, such that the pitch is correctly set. In case of a stop process, e.g. an emergency stop operation, wind energy can be transformed into a mechanical energy and stored in the reservoir 340. As already explained for the embodiment with a pitch system with the motor 210 shown in FIG. 3, the wind forces the rotor blade from a operating position, e.g. 0° position A or operating position B, in direction of the feathered position, in addition the force exerted by the spring 320. The valve 330 is adapted to guide a fluid pressure generated by the spring 320 and/or the wind on the rotor blade in the actuator into the reservoir. Thus, in the reservoir the pressure of the air in case of a pneumatical pitch system or the pressure of the nitrogen bubble in case of a hydraulic pitch system is increased. This stored mechanical energy may used later, if the rotor blade has to be pitched from the feathered position D into an operating position. In a specific embodiment, the spring 320 may be integrated into the hydraulical or pneumatic actuator 310.

An advantage of the embodiment with a spring driven pitch system is that there is no necessity to distinguish between an emergency operation and a controlled automatic mode. Only when the pitch controller 220 fails, the emergency operation is unregulated. As long the pitch controller 220 is running, a position and velocity control mode is always active and emergency operation mode is only "hot stand by". Thus, the present patent application has the advantage that the loads exerted on structural components of the wind turbine can be lowered in some load cases. Therefore, lower cost components may be used. The emergency situation may also be triggered by a mechanist who is pushing an emergency stop button. By giving feedback to this controller, a more configuration-independent control can be designed.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A wind turbine comprising:
    a rotor comprising a first rotor blade having a longitudinal axis; and
    a pitch control system comprising a first drive system for generating a force to adjust a pitch angle of the first rotor blade in an active mode,
    wherein the first drive system is configured to transform a rotational movement of the first rotor blade about the longitudinal axis into another form of energy such that a counter torque against the rotational movement is induced in a passive mode, the counter torque being different from the force, and
    wherein the pitch control system is configured to control the counter torque for controlling an angular velocity of the first rotor blade in the rotational movement.

2. The wind turbine according to claim 1, wherein the first drive system comprises a motor configured to be operated as an electric generator for generating an electric current.

3. The wind turbine according to claim 2, wherein the pitch control system further comprises a controller for controlling the pitch angle, the electric current being used to power the controller.

4. The wind turbine according to claim 2, wherein the pitch control system is further configured to connect the motor to a dump load so that the electric current can be dumped into the dump load or fed into an electrical energy storing device or into a grid.

5. The wind turbine according to claim 1, wherein the rotor further comprises a second rotor blade and the pitch control system further comprises a second drive system for adjusting a pitch angle of the second rotor blade, wherein the pitch control system is further configured to feed the energy generated by the first drive system when being driven by the first rotor blade to the second drive system.

6. The wind turbine according to claim 1, wherein the first rotor blade is connected to a spring urging the first rotor blade to rotate about the longitudinal axis.

7. The wind turbine according to claim 6, wherein the first rotor blade is rotatable about the longitudinal axis within a pitch range between an operating position and a feathered position, wherein the spring is arranged such that the spring stores mechanical energy when the first rotor blade is rotated in a direction from the feathered position to the operating position.

8. The wind turbine according to claim 6, wherein the spring urges the first rotor blade to rotate in a direction of a feathered position.

9. The wind turbine according to claim 6, wherein the spring is a mechanical spring.

10. The wind turbine according to claim 1, wherein the pitch control system further comprises a sensor, wherein the pitch control system is configured to control the angular velocity dependent on a signal of the sensor.

11. The wind turbine according to claim 10, wherein the sensor is a vibration sensor or an accelerometer.

12. The wind turbine according to claim 1, wherein the first drive system comprises a hydraulic or pneumatic drive system.

13. A method for controlling an angular velocity of a rotor blade of a wind turbine, the wind turbine comprising a drive system for adjusting a pitch angle of the rotor blade, the method comprising:
   operating the drive system in an active mode in which the drive system generates a force to rotate the rotor blade about its longitudinal axis;
   operating the drive system in a passive mode in which the drive system exerts a counter torque against a rotational movement of the rotor blade about its longitudinal axis when the rotor blade is rotated from a first position to a second position by another force than a force of the drive system, the counter torque being different from the force; and
   controlling the counter torque for controlling the angular velocity of the rotor blade in the rotational movement.

14. The method according to claim 13, wherein the first position is an operating position and the second position is a neutral position, the first position is an operating position and the second position is a feathered position, or the first position is a feathered position and the second position is a neutral position.

15. The method according to claim 13, wherein the drive system comprises a motor configured to be operated in a motor mode and a generator mode, or a hydraulic or pneumatic drive system.

16. The method according to claim 13, wherein the rotor blade is rotated from the first position to the second position by wind or by a spring.

17. A controller for a wind turbine comprising a rotor blade and a first drive system for adjusting a pitch angle of the rotor blade, the controller being configured to:
   operate the first drive system in an active mode in which the first drive system generates a force to rotate the rotor blade about its longitudinal axis;
   operate the first drive system in a passive mode in which the first drive system exerts a counter torque against a rotational movement of the rotor blade about its longitudinal axis when the rotor blade is rotated about its longitudinal axis by another force than a force of the first drive system, the counter torque being different from the force; and
   control the counter torque for controlling an angular velocity of the rotor blade in the rotational movement.

18. The controller according to claim 17, wherein the controller is further configured to switch the first drive system to the passive mode when the rotor blade is rotated from an operating position to a neutral position, and to switch the first drive system to the active mode, to rotate the rotor blade from the neutral position to a feathered position.

19. The controller according to claim 17, wherein the first drive system comprises a motor, a pneumatic or hydraulic drive system.

20. The controller according to claim 17, wherein the another force is generated by a spring.

* * * * *